March 14, 1944. R. G. DYKEMAN ET AL 2,343,868
CONGEALABLE LIQUID CONDITIONING DEVICE
Filed Sept. 10, 1941 2 Sheets-Sheet 1

Reuben G. Dykeman INVENTOR
Joseph C. Shaw
BY Allan C. Hoffman

C. B. Stevens ATTORNEY

March 14, 1944.   R. G. DYKEMAN ET AL   2,343,868
CONGEALABLE LIQUID CONDITIONING DEVICE
Filed Sept. 10, 1941   2 Sheets-Sheet 2

Allan C. Hoffman
Reuben H. Dykeman
Joseph C. Shaw   INVENTORS
BY
C. B. Stevens   ATTORNEY.

Patented Mar. 14, 1944

2,343,868

UNITED STATES PATENT OFFICE 2,343,868

CONGEALABLE LIQUID CONDITIONING DEVICE

Reuben G. Dykeman, Joseph C. Shaw, and Allan C. Hoffman, Dayton, Ohio

Application September 10, 1941, Serial No. 410,228

17 Claims. (Cl. 257—2)

This invention pertains to a congealable liquid conditioning device, and particularly to a heat exchange unit for use in a lubricant conditioning system wherein lubricant is circulated under pressure and subjected to heat to quickly bring the same to the desired viscosity and temperature and to thereafter maintain it in such condition. While the invention will be hereinafter described as a part of the lubricant conditioning system of an aircraft engine, it will be understood that it is not limited thereto but is capable of application in connection with other systems and devices utilizing a congealable liquid and of which a heat exchange unit forms a part.

Due to the development of high horsepower motors, and especially such as are used in airplanes and tanks, and the more recent types of automobiles and boats, it has been found desirable to condition the lubricating oil to the proper temperature and viscosity for most efficient and economical functioning and use in a minimum of time, and to thereafter maintain a lubricating oil within the desired limits wherein such oil will operate and function to the best advantage. As the operating parts of such motors function at a high rate of speed from initial starting, it is important that all moving parts thereof be properly lubricated from that moment, or as near to such moment as possible. The rate of oil flow to and over the parts to be lubricated is directly proportional to the viscosity of the oil.

Lubricating oils are quite sensitive to thermal change and tend to thicken or congeal throughout the circulatory system and particularly in the radiator or heat exchange unit when the motor or other apparatus with which the system is used is at rest or is functioning idly as, for example, during an airplane glide. The flow of oil at the moment of initial starting or speeding up of a motor or other apparatus is therefore quite slow, and continues so until the oil in the entire system is brought to the desired temperature and viscosity which heretofore has required considerable time, and during which period the lubricating oil does not have the maximum flow and lubricating qualities desired.

The present invention provides a radiator or cooler unit for use in an oil circulatory system wherein the oil is circulated under pressure and subjected to heat, and which radiator or cooler unit embodies two alternative flow paths including a by-pass path adapted to initially circulate a small portion of the oil supply through the apparatus to be lubricated over and over again for quickly bringing such small portion of the oil to the desired temperature and viscosity. The main flow path includes the radiator and cooling unit through which oil is automatically deflected as its temperature increases and its viscosity becomes less. Means are provided which are responsive to the viscosity of the oil for directing the oil to one path or the other, or both, as the oil condition dictates. Means are also provided for effecting an interchange of heat between the oil flowing through the by-pass and the oil in the radiator unit to result in bringing the oil in both paths to approximately the same condition of temperature and viscosity as quickly as possible from the moment of initial flow of oil through the by-pass circuit. Means are likewise provided which, in this instance, take the form of a low pressure path through the radiator or cooler unit for the purpose of lessening the resistance to flow of oil through the radiator or cooler unit to thereby speed up the initial bringing of the oil in the radiator or cooler unit to the desired temperature and viscosity, and to minimize the possibility of congealing of the oil in the radiator or cooler unit after flow has once been established therethrough.

An object of the invention is to provide a congealable liquid conditioning device of simple construction, capable of being economically manufactured and which will be efficient in operation, uniform in action, automatically controlled, and unlikely to get out of repair.

Another object of the invention is to provide a congealable liquid conditioning device wherein the circulation of oil therethrough is controlled by the degree of viscosity of the oil.

A further object of the invention is to provide a congealable liquid conditioning device embodying means for rapidly conditioning the oil and thereafter maintaining at the proper temperature and viscosity for the most efficient and economical functioning and use.

A further object of the invention is to provide a congealable liquid conditioning device embodying means for rapidly conditioning the oil, and also for establishing a low pressure flow path through the conditioning device to minimize congealing of the oil after flow has once been established.

A further object of the invention is to provide a congealable liquid conditioning device for lubrication systems, and to provide means for quickly and automatically thawing congealed lubricant to relieve congestion within the cooling unit and thereafter maintain a substantially equalized temperature of the lubricant.

A further object of the invention is to provide a congealable liquid conditioning device having the advantageous features of construction and the meritorious characteristics herein mentioned.

With the above primary and other incidental objects in view as will more fully appear in the specification, the invention consists of the features of construction, the parts and combinations thereof, and the mode of operation and its equivalents, as hereinafter described and set forth in the claims.

Referring to the accompanying drawings, wherein is shown the preferred but obviously not necessarily the only form of embodiment of the invention:

Like parts are indicated by similar characters of reference throughout the several views.

Figure 1:
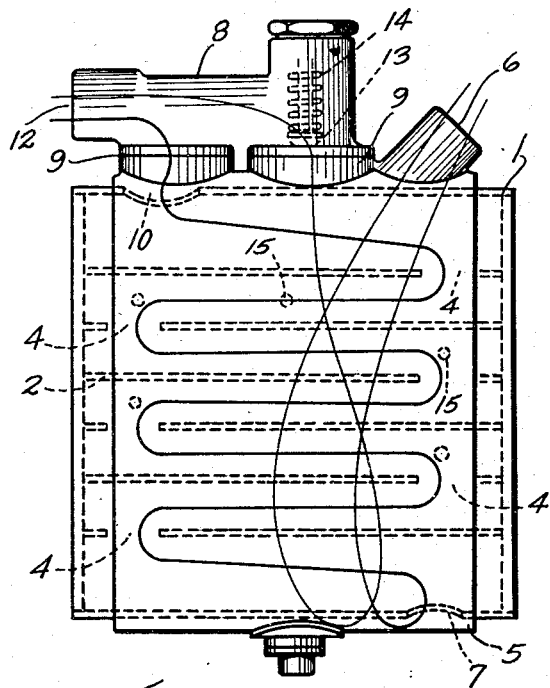
Fig. 1 is a side elevation of a congealable liquid conditioning device embodying the ideas of this invention.
Figure 2:
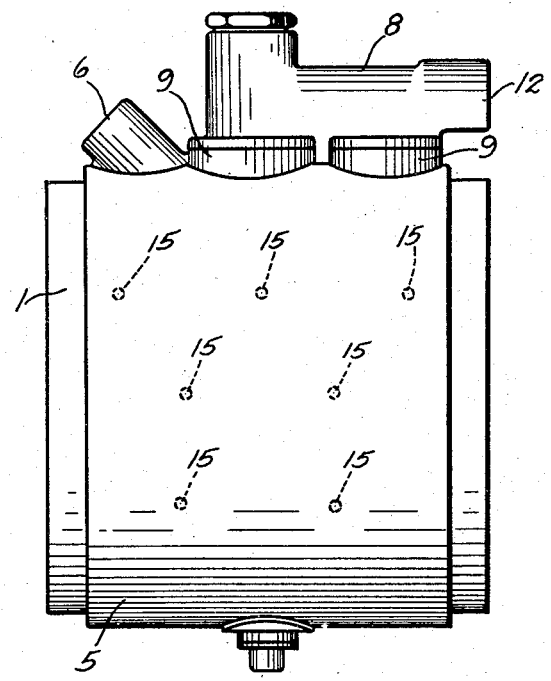
Fig. 2 is a side elevation of the device shown in Fig. 1 and showing the intercommunicating ports between the by-pass passage and the radiator or core portion of the congealable liquid conditioning device shown in Fig. 1, this view being of the opposite side of the device from that side shown in Fig. 1.

Referring to the drawings, there is shown a radiator or heat exchange unit of a tubular air cooled system as commonly used in automobile or aircraft radiators. The radiator consists of a cylindrical shell 1, in the preferred form shown, divided by baffles 2 into a succession of compartments each filled with parallel tubes 3 (Figs. 3 and 4) open at their ends for flow of air therethrough and spaced apart to form flow passages therebetween for the circulation of oil or other liquid to be cooled. Interconnecting ports 4 are provided between the compartments of the radiator in the baffles 2 at alternating ends of the radiator whereby the oil or other fluid flowing through the radiator follows a tortuous path in passing from one compartment to the next. The heat dissipation obtainable in a cooler, for example, is directly proportionate to the length of the flow path through the cooler. Obviously, forms of radiator construction other than that illustrated may be utilized or, for some installations, a water cooled or similar type of heat exchange unit may be employed. Surrounding the radiator or cooler unit is a jacket or shell 5 forming a conducting chamber through which oil or other fluid flows under certain predetermined temperature and viscosity conditions as will hereinafter be apparent. The jacket 5 is connected to an inlet 6 leading from the motor or power unit (not shown), and an inlet or opening 7 providing means whereby oil or other fluid entering the inlet 6 of the jacket or shell 5 may, under certain conditions of viscosity and temperature of the lubricant or other fluid, enter the radiator or core and travel in a tortuous path around the baffles 2 through such radiator or core.

As one form of means for controlling the flow of lubricant or other fluid through the chamber formed by the shell or jacket 5 or through the radiator or core in accordance with the temperature and viscosity of the oil, there is shown a valve mechanism 8 mounted on suitable flanges 9 which form a part of the heat exchange unit and are disposed oppositely to the inlet or opening 7 from the jacket or shell 5 to the radiator or core. One of the flanges 9 forms a part of an opening 10 leading from the radiator or core to the outlet 12 of the valve mechanism 8. The other flange 9 forms a part of the opening from the jacket or shell 5 to the valve mechanism 8. In this latter opening there is disposed a valve 13 which is urged toward the position of closing the opening between the jacket or shell 5 and the valve mechanism 8 by a spring 14.

Figure 3:
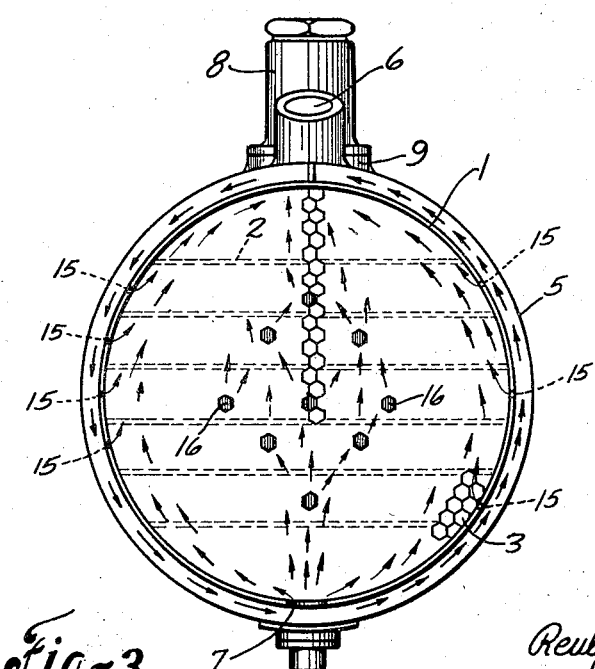
Fig. 3 is an end elevation of the device shown in Figs. 1 and 2.

In the operation of this congealable liquid conditioning device as so far described, assuming that at the start of operation of the motor the lubricant is of low temperature and high viscosity and at which time the lubricant within the radiator or core of the conditioning device will be congealed, from beginning of operation of the motor lubricant enters at the inlet 6 under pressure and flows through the chamber between the jacket or shell 5 and the shell 1 of the radiator body in the direction indicated by the arrows (Fig. 3). Oil pressure in the chamber will be exerted to the inlet or opening 7 on the interior of the radiator or core of the device. However, with the lubricant in such radiator or core in congealed condition the resistance to flow of lubricant in a tortuous path through the radiator or core will be greater than the closing effect of the spring 14 on the valve 13 which controls the outlet opening from the jacket or shell to the valve mechanism 8. Under these conditions, the lubricant entering the inlet 6 under pressure will flow completely around the radiator or core through the chamber to force the valve 13 open, past which the lubricant flows through the valve mechanism 8 to the outlet 12.

Such condition exists until the lubricant within the radiator or core has become sufficiently warm and low in viscosity that the pressure necessary to force the lubricant through the passages formed by the baffles 2 and the radiator or core is less than the pressure necessary to overcome the closing effect of the spring 14 on the valve 13 whereupon the valve 13 will close and the lubricant will flow from the inlet 6 around the right-hand portion of the jacket or shell 5 as shown in Figs. 1 and 3, and thence through the inlet or opening 7 into the baffled interior of the radiator or core, and after flowing through a tortuous path as indicated in Fig. 1, will flow out of the conditioning device through the opening 10 in the shell 1 and through the outlet 12 of the valve mechanism 8 to whatever point in the system desired. It will be understood that the valve mechanism 8 herein described is shown merely for illustrative purposes and that various other types of valve mechanisms may be used as, for example, one including a valve 13 whose opened and closed position is governed by a thermostatic device. It will also be understood that the flow circuit herein disclosed is illustrative of only one embodiment of the invention and that the device is susceptible to change as regards the flow circuit without departing from the scope of the invention.

It has heretofore been accepted practice to provide for heat exchange between the oil flowing around the chamber defined by jacket 5 and the congealed oil in the radiator or core for the purpose of warming the oil in the radiator or core so that oil will flow freely therethrough or, in addition to heat exchange between the oil flowing through the jacket or shell, to provide one or more by-passes through the central part of the radiator or core. In either event such heat exchange must take place by conduction of heat through the shell 1 or through the walls of the by-passes which are disposed diametrically across the radiator or core. It is therefore evident that the time necessary to warm the congealed oil in the radiator or core is considerable since heat must first pass through the shell 1 or through the walls of the by-passes and thence gradually toward the center of the radiator or core.

In accordance with this invention, it is relatively immaterial that the chamber immediately inside jacket or shell 5 serve as other than a flow path for the oil. Small holes or openings 15 have been provided in the radiator or core shell 1 which establish communication between the oil flowing through the chamber within jacket or shell 5 and the oil in the interior of the radiator or core. In the illustrated embodiment these holes or openings are shown as being provided on opposite sides of the radiator shell in uneven numbers and are so arranged as to provide communication between the chamber defined by jacket or shell 5 and the interior of the radiator or core at a plurality of levels between the inlet 7 thereto and the outlet 6 thereof, and the holes are so arranged to provide communication from the jacket or shell through the radiator or core intermediate adjacent baffles in the radiator or core.

With such construction, considering the oil in the radiator or core as being in congealed condition, when the motor is started and oil under pressure is supplied to the inlet 6, the oil will first flow around the radiator or core through the chamber as hereinbefore described. Since this oil is under pressure and since a predetermined back pressure is created by reason of the loading of the valve 13 by the spring 14, such oil under pressure flowing through the jacket or shell 5 will seek the path of least resistance which will be through the holes or openings 15 in the radiator or core shell 1. Oil under pressure flowing through the small openings 15 will increase considerably in velocity and will impinge directly on the congealed oil in the radiator or core at different levels between the inlet to and the outlet from the radiator. Such direct impingement of the hot oil on the congealed oil within the radiator or core will result in a direct diffusion and transfer of heat with a consequent raising of the temperature of the congealed oil within the radiator or core and lessening of the viscosity thereof.

It has been found in practice that the pressure required to force the congealed oil out of the top baffled section of the radiator or core illustrated is considerably less than that required to force the oil out of the next section between the top section and the inlet 7 of the radiator or core, and that for each succeeding section from the top section toward the inlet 7 the pressure necessary to force the oil out of such succeeding sections becomes correspondingly greater. That is, when pressure is applied from the oil flowing through the chamber to the interior of the radiator or core through the openings 15 the top baffled section of the radiator or core will warm up and will flow therethrough first with the next succeeding sections between the top baffled section and the inlet 7 coming into flow condition in seriatim until finally all of the sections are warmed and oil will begin flowing through the inlet 7 through the radiator or core to the outlet 12 since the pressure necessary to force the oil through the baffled radiator or core is less than that necessary to move the valve 13 off its seat against the resistance of the spring 14.

Correspondingly, since multiple paths are provided for oil flow from the jacket or shell 5 to the radiator or core instead of only one inlet, such as the inlet 7, being provided, the pressure drop across the radiator or core, or that pressure necessary to cause flow of oil through the baffled section of the core becomes correspondingly less. It will be understood that the size and relative disposition of the small holes or openings 15 may be varied to accommodate different conditions and requirements.

Figure 4:
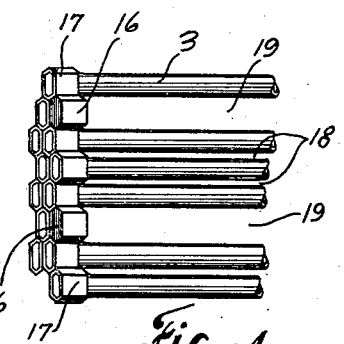
Fig. 4 is a fragmentary perspective view showing the construction and arrangement of the heat exchange portion of the liquid conditioning device shown in Figs. 1, 2 and 3.
Figure 5:
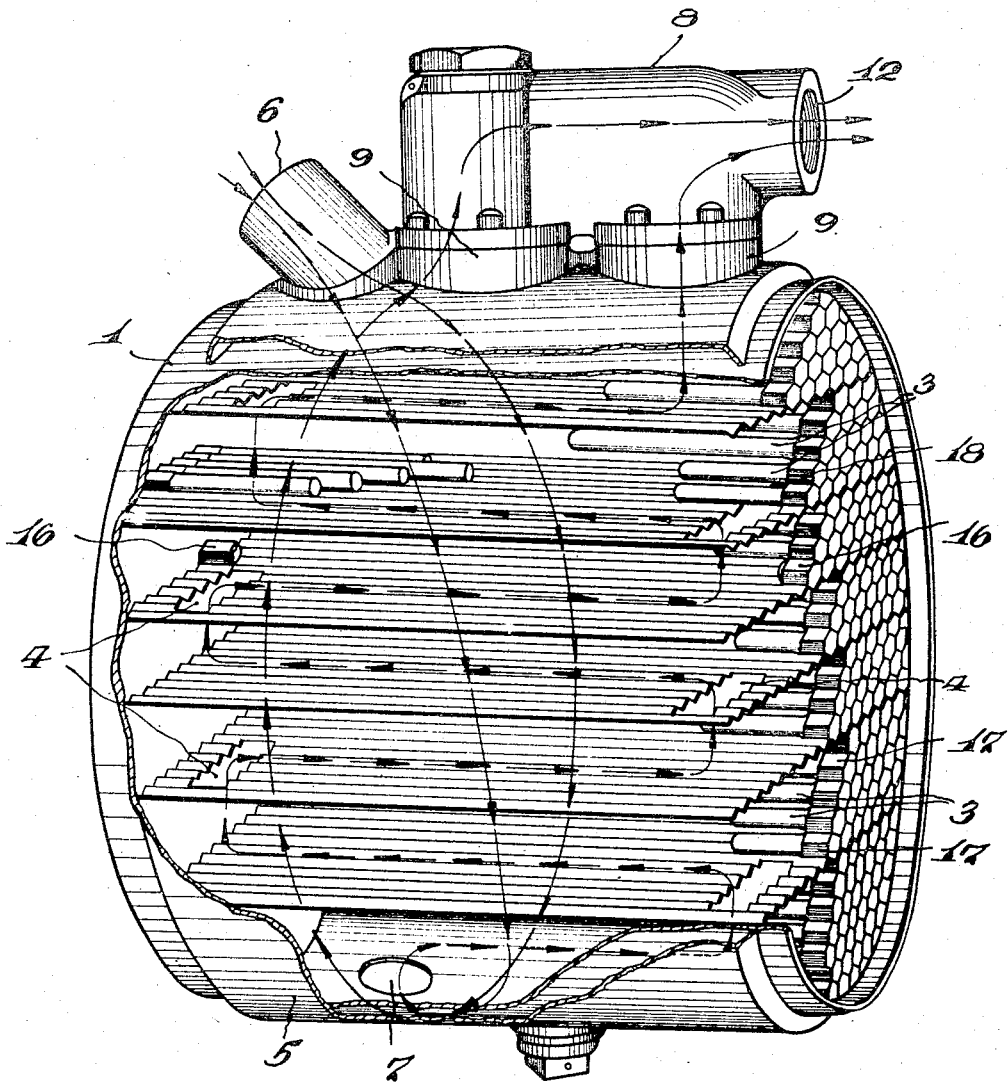
Figure 5 is a fragmentary perspective view, partly in section, showing the construction of and the oil flow paths in the congealable liquid conditioning device.

Referring to Figs. 3 and 4, certain of the tubes 3 are spaced further apart than others by inserting a solid head 16 intermediate adjacent heads 17 of the tubes 3 to form low resistance flow paths at predetermined points in the radiator or core. As shown in Fig. 3, solid heads 16 have been arranged in a predetermined pattern within the central flow area of the radiator or core, said central flow area being known to be the area wherein the lubricant flowing through the radiator or core is subjected to the greatest cooling effect.

By the establishment of such low pressure or low resistance flow paths, oil flowing through the radiator or core from the chamber through the inlet 7, and thence around the baffles 2 by way of the spacings 18 between the tubes 3 will obviously seek the paths of least flow resistance, namely, the paths provided by the greater spacings 19 between the radiator or core tubes, such flow path of the lubricant being indicated by the arrows in the central portion of the unit shown in Fig. 3. With such construction, the lubricant flowing through the radiator or core, and tending to follow the path of least flow resistance, flows in greater volume through the central portion of the radiator or core in which the flow paths of least resistance are provided, and such greater flow of lubricant has the effect of diminishing or eliminating congealing of the lubricant in the central portion of the radiator or core under conditions of low temperature of air or other cooling medium flowing through the tubes 3.

Referring to the drawings and preceding description, it will be seen that by means of this invention there has been provided a liquid conditioning device for use with congealable liquids of such nature that the initial condition of lubricant within the radiator or core will take place in a minimum of time, and such lubricant having once been brought to the desired temperature and viscosity will be maintained thereat without congealing within the radiator or core. This has been accomplished by providing for a direct impingement and contact of warm lubricant with the lubricant within the radiator or core at a plurality of points intermediate the inlet and outlet of the radiator or core and providing for low resistance flow paths for the lubricant within the area of the radiator or core subjected to the greatest cooling effect of a cooling medium. Pressure is also exerted by such lubricant entering the openings in the radiator or core shell as hereinbefore described to displace congealed lubricant initially in the sections to which the openings lead. That is, the construction is such that there is a direct transfer of heat from one portion of the lubricant to another and a diffusion of conditioned heated lubricant throughout the radiator or core from a multiplicity of points. In addition, the flow paths of low resistance which, in this instance, are shown as being staggered serve to either diminish or entirely eliminate congealing of the lubricant within the central portion of the radiator or core.

We claim:

1. A liquid conditioning device for use in a liquid circulating system wherein a liquid, the viscosity of which varies progressively with changes in temperature, is circulated under pressure and subjected to heat, including a radiator body having an outlet disposed at one side thereof, a plurality of spaced means within the radiator body disposed so as to provide for the passage of a coolant therethrough and for the passage therearound of the liquid to be conditioned, certain of said means being spaced from each other so as to provide liquid flow paths therebetween of a cross-sectional area which afford resistance to the passage of liquid therethrough, and certain others of said means being spaced so as to provide liquid flow paths therebetween of a greater cross-sectional area and of lesser resistance to the flow of liquid than the resistance to flow occurring between the first-mentioned means, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and by-pass means other than the conduit inlet and the conduit outlet leading to the radiator body for continuously causing a portion of the warm liquid flowing under pressure through the conduit to be by-passed into the liquid contained in the radiator body, whereby the liquid contained within the radiator body is conditioned and caused to flow through said flow paths of the body.

2. A liquid conditioning device for use in a liquid circulating system wherein a liquid, the viscosity of which varies progressively with changes in temperature, is circulated under pressure and subjected to heat, including a radiator body having an outlet disposed at one side thereof, a plurality of spaced means within the radiator body disposed so as to provide for the passage of a coolant therethrough and for the passage therearound of the liquid to be conditioned, certain of said means being spaced from each other so as to provide liquid flow paths therebetween of a cross-sectional area which afford resistance to the passage of liquid therethrough, and certain others of said means being spaced so as to provide liquid flow paths therebetween of a greater cross-sectional area and of lesser resistance to the flow of liquid than the resistance to flow occurring between the first-mentioned means, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and a plurality of spaced by-pass means other than the conduit inlet and the conduit outlet leading to the radiator body for continuously causing a portion of the warm liquid flowing under pressure through the conduit to be by-passed at a multiplicity of points into the liquid contained in the radiator body, whereby the liquid contained within the radiator body is conditioned and caused to flow through the body.

3. A liquid conditioning device for use in a liquid circulating system wherein a liquid, the viscosity of which varies progressively with changes in temperature, is circulated under pressure and subjected to heat, including a radiator body having an outlet disposed at one side thereof, a plurality of spaced means within the radiator body disposed so as to provide for the passage of a coolant therethrough and for the passage therearound of the liquid to be conditioned, certain of said means being spaced from each other so as to provide liquid flow paths therebetween of a cross-sectional area which afford resistance to the passage of liquid therethrough, and certain others of said means being spaced so as to provide liquid flow paths therebetween of a greater cross-sectional area and of lesser resistance to the flow of liquid than the resistance to flow occurring between the first mentioned means, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and a plurality of spaced by-pass means other than the conduit inlet and the conduit outlet leading to the radiator body for continuously causing a portion of the warm liquid flowing under pressure through the conduit to be by-passed at a multiplicity of points into the liquid contained in the radiator body, said last-named means on one side of the conduit outlet leading to the radiator body being less in number than those of the other side of said conduit outlet so as to substantially equalize the transfer of heat between the liquid flowing through the conduit and the liquid contained in the body, whereby the liquid contained within the body is conditioned and caused to flow through the body.

4. A liquid conditioning device for use in a liquid circulating system wherein a liquid, the viscosity of which varies progressively with changes in temperature, is circulated under pressure and subjected to heat, including a radiator body having an outlet disposed at one side thereof, a plurality of spaced means within the radiator body disposed so as to provide for the passage of a coolant therethrough and for the passage therearound of the liquid to be conditioned, certain of said means being spaced from each other so as to provide liquid flow paths therebetween of a cross-sectional area which afford resistance to the passage of liquid therethrough, and certain others of said means being spaced so as to provide liquid flow paths therebetween of a greater cross-sectional area and of lesser resistance to the flow of liquid than the resistance to flow occurring between the first-mentioned means, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and a plurality of spaced by-pass means other than the conduit inlet and the conduit outlet leading to the radiator body for continuously causing a portion of the warm liquid flowing under pressure through the conduit to be by-passed into the liquid contained in the radiator body, said by-pass means being greater in number between the conduit outlets than those between the conduit inlet and the conduit outlet leading to the radiator body, whereby to substantially equalize the transfer of heat between the liquid flowing in the conduit and the liquid contained in the radiator body.

5. A liquid conditioning device for use in a liquid circulating system wherein a liquid, the viscosity of which varies progressively with changes in temperature, is circulated under pressure and subjected to heat, including a radiator body having an outlet disposed at one side thereof, a plurality of spaced means within the radiator body disposed so as to provide for the passage of a coolant therethrough and for the passage therearound of the liquid to be conditioned, certain of said means being spaced from each other so as to provide liquid flow paths therebetween of a cross-sectional area which afford resistance to the passage of liquid therethrough, and certain others of said means being spaced so as to provide liquid flow paths therebetween of a greater cross-sectional area and of lesser resistance to the flow of liquid than the resistance to flow occurring between the first-mentioned means, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means providing a plurality of liquid cooling zones within said radiator body, said cooling zones being interconnected to form a continuous flow path from the outlet of the conduit, which forms the inlet to the radiator body, to the outlet of the latter, means disposed between the conduit outlets for relieving the pressure on the warm liquid flowing through said conduit when the pressure exceeds a predetermined maximum, and by-pass means other than the conduit inlet and the conduit outlet which leads to the radiator body for continuously causing a portion of the warm liquid flowing through the conduit to be by-passed into the liquid contained in each of said cooling zones, whereby the liquid contained in said cooling zone is conditioned and caused to flow therethrough.

6. A liquid conditioning device for use in a liquid circulating system wherein a liquid, the viscosity of which varies progressively with changes in temperature, is circulated under pressure and subjected to heat, including a radiator body having an outlet disposed at one side thereof, a plurality of spaced means within the radiator body disposed so as to provide for the passage of a coolant therethrough and for the passage therearound of the liquid to be conditioned, certain of said means being spaced from each other so as to provide liquid flow paths therebetween of a cross-sectional area which afford resistance to the passage of liquid therethrough, and certain others of said means being spaced so as to provide liquid flow paths therebetween of a greater cross-sectional area and of lesser resistance to the flow of liquid than the resistance to flow occurring between the first-mentioned means, a warm liquid conduit disposed in heat exchange relationship with the body and having an inlet and a pair of spaced outlets, one of said conduit outlet being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and by-pass means other than the conduit inlet and the conduit outlet leading to the radiator body for continuously causing a portion of the warm liquid flowing under pressure through the conduit to be by-passed into the liquid contained in the radiator body, said conduit inlet being disposed adjacent to the outlet of the radiator body so that the heat of the warm liquid entering the conduit inlet is transferred directly to the liquid in the area of the body adjacent the body outlet and then to the remainder of the liquid in the body in progressively decreasing degrees of temperature toward the outlet of the conduit which forms the inlet to said radiator body, whereby the liquid contained within the radiator body is conditioned and caused to flow through the body.

7. A liquid conditioning device for use in a liquid circulating system wherein a liquid, the viscosity of which varies progressively with changes in temperature, is circulated under pressure and subjected to heat, including a radiator body having an outlet disposed at one side thereof, a plurality of spaced means within the radiator body disposed so as to provide for the passage of a coolant therethrough and for the passage therearound of the liquid to be conditioned, certain of said means being spaced from each other so as to provide liquid flow paths therebetween of a cross-sectional area which afford resistance to the passage of liquid therethrough, and certain others of said means being spaced so as to provide liquid flow paths therebetween of a greater cross-sectional area and of lesser resistance to the flow of liquid than the resistance to flow occuring between the first-mentioned means, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and by-pass means other than the conduit inlet and the conduit outlet leading to the radiator body for continuously causing a portion of the warm liquid flowing under pressure through the conduit to be by-passed into the liquid contained in the radiator body, said conduit inlet and radiator outlet being disposed at substantially the same side of the radiator body so that the liquid passing through the conduit follows a flow path reverse to the normal liquid flow path through the radiator body, whereby the liquid contained within the radiator body is conditioned and caused to flow through the body.

8. A liquid conditioning device for use in a liquid circulating system wherein a liquid, the viscosity of which varies progressively with changes in temperature, is circulated under pressure and subjected to heat, including a radiator body having an outlet disposed at one side thereof, a plurality of spaced means within the radiator body disposed so as to provide for the passage of a coolant therethrough and for the passage therearound of the liquid to be conditioned, certain of said means being spaced from each other so as to provide liquid flow paths therebetween of a cross-sectional area which afford resistance to the passage of liquid therethrough, and certain others of said means being spaced so as to provide liquid flow paths therebetween of a greater cross-sectional area and of lesser resistance to the flow of liquid than the resistance to flow occurring between the first mentioned means, a warm liquid conduit disposed in heat exchange relationship with the body and having an inlet and a pair of spaced outlets, one of said conduit outlets being disposed at the opposite side of the radiator from the outlet of the latter and forming an inlet to the radiator body, said conduit outlets further being so positioned with respect to the conduit inlet that a portion of the heat of the warm liquid flowing through the conduit will be transferred to the liquid in the radiator body before said warm liquid passes through any of said outlets, means providing a plurality of liquid cooling zones within said radiator body, said cooling zones being interconnected to form a continuous flow path from the outlet of the conduit, which forms the inlet to the radiator body, to the outlet of the latter, means disposed between the conduit outlets for relieving the pressure on the warm liquid flowing through said conduit when the pressure exceeds a predetermined maximum, and by-pass means other than the conduit inlet and the conduit outlet which leads to the radiator body for continuously causing a portion of the warm liquid flowing through the conduit to be by-passed into the liquid contained in each of said cooling zones, said by-pass means being disposed so as to lie closely adjacent to the radiator body outlet and the inlet of the warm liquid conduit, whereby the liquid contained within the radiator body is conditioned and caused to flow through the radiator body.

9. A liquid conditioning device for use in a liquid circulating system wherein a liquid, the viscosity of which varies progressively with changes in temperature, is circulated under pressure and subjected to heat, including a radiator body having an outlet, a plurality of spaced means within the radiator body disposed so as to provide for the passage of a coolant therethrough and for the passage therearound of the liquid to be conditioned, certain of said means being spaced from each other so as to provide liquid flow paths therebetween of a cross-sectional area which afford resistance to the passage of liquid therethrough and certain others of said means being spaced so as to provide liquid flow paths therebetween of a greater cross-sectional area and of lesser resistance to the flow of liquid than the resistance to flow occurring between the first-mentioned means, a warm liquid conduit disposed in heat exchange relationship with the body and having an inlet and a pair of spaced outlets, one of said conduit outlets forming an inlet to the radiator body, said conduit outlets being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and by-pass means other than the conduit inlet and the conduit outlet leading to the radiator body for continuously causing a portion of the warm liquid flowing under pressure through the conduit to be by-passed into the liquid contained in the radiator body, whereby the liquid contained within the radiator body is conditioned and caused to flow through the body.

10. A liquid conditioning device for use in a liquid circulating system wherein a liquid, the viscosity of which varies progressively with changes in temperature, is circulated under pressure and subjected to heat, including a radiator body having an outlet, a plurality of spaced means within the radiator body disposed so as to provide for the passage of a coolant therethrough and for the passage therearound of the liquid to be conditioned, certain of said means being spaced from each other so as to provide liquid flow paths therebetween of a cross-sectional area which afford resistance to the passage of liquid therethrough and certain others of said means being spaced so as to provide liquid flow paths therebetween of a greater cross-sectional area and of lesser resistance to the flow of liquid than the resistance to flow occurring between the first-mentioned means, a warm liquid conduit disposed in heat exchange relationship with the body and having an inlet and a pair of spaced outlets, one of said conduit outlets forming an inlet to the radiator body, said conduit outlets being so positioned with respect to the conduit inlet that a portion of the heat of the warm liquid flowing through the conduit will be transferred to the liquid in the radiator body before said warm liquid passes through at least one of said outlets, means disposed between the conduit outlets for relieving the pressure on the warm liquid flowing through the said conduit when the pressure exceeds a predetermined maximum, and by-pass means other than the conduit inlet and the conduit outlet leading to the radiator body for continuously causing a portion of the warm liquid flowing under pressure through the conduit to be by-passed into the liquid contained in the radiator body, whereby the liquid contained within the radiator body is conditioned and caused to flow through the body.

11. A liquid conditioning device for use in a liquid circulating system wherein a liquid, the viscosity of which varies progressively with changes in temperature, is circulated under pressure and subjected to heat, including a radiator body having an outlet, a plurality of spaced means within the radiator body disposed so as to provide for the passage of a coolant therethrough and for the passage therearound of the liquid to be conditioned, certain of said means being spaced from each other so as to provide liquid flow paths therebetween of a cross-sectional area which afford resistance to the passage of liquid therethrough and certain others of said means being spaced so as to provide liquid flow paths therebetween of a greater cross-sectional area and of lesser resistance to the flow of liquid than the resistance to flow occurring between the first-mentioned means, a warm liquid conduit having an inlet and a pair of spaced outlets, one of said conduit outlets forming an inlet to the radiator body, said conduit outlets being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and by-pass means other than the conduit inlet and the conduit outlet leading to the radiator body for continuously causing a portion of the warm liquid flowing under pressure through the conduit to be by-passed into the liquid contained in the radiator body, whereby the liquid contained within the radiator body is conditioned and caused to flow through the body.

12. A liquid conditioning device for use in a liquid circulating system wherein a liquid, the viscosity of which varies progressively with changes in temperature, is circulated under pressure and subjected to heat, including a radiator body having an outlet, a plurality of spaced means within the radiator body disposed so as to provide for the passage of a coolant therethrough and for the passage therearound of the liquid to be conditioned, certain of said means being spaced with respect to each other so as to provide liquid flow paths therebetween of a cross-sectional area which afford resistance to the passage of liquid therethrough, means for spacing certain others of said coolant means so as to provide liquid flow paths of a greater cross-sectional area and of lesser resistance to the flow of liquid therebetween than the resistance to flow occurring between the first-mentioned coolant means, a warm liquid conduit having an inlet and a pair of spaced outlets, one of said conduit outlets forming an inlet to the radiator body, said conduit outlets being so positioned with respect to the conduit inlet that a portion of the heat of the warm liquid flowing through the conduit will be transferred to the liquid in the radiator body before said warm liquid passes through any of said outlets, means disposed between the conduit outlets for relieving the pressure on the warm liquid flowing through said conduit when the pressure exceeds a predetermined maximum, and by-pass means other than the conduit inlet and the conduit outlet leading to the radiator body, for continuously causing a portion of the warm liquid flowing under pressure through the conduit to be by-passed into the liquid contained in the radiator body, whereby the liquid contained within the radiator body is conditioned and caused to flow through said flow paths of the body.

13. A lubricant conditioning device for use in a lubricant circulating system, wherein a lubricant, the viscosity of which varies progressively with changes in temperature, is circulated under pressure and subjected to heat, including a radiator body having inlet and outlet openings and formed to provide a flow path therebetween, a plurality of spaced means within the radiator body disposed so as to provide for the passage of a coolant therethrough and for the passage therearound of the liquid to be conditioned, certain of said means being spaced with respect to each other so as to provide liquid flow paths therebetween of a cross-sectional area which afford resistance to the passage of liquid therethrough, means for spacing certain others of said coolant means so as to provide liquid flow paths of a greater cross-sectional area and of lesser resistance to the flow of liquid therebetween than the resistance to flow occurring between the first-mentioned coolant means, means for introducing lubricant under heat and pressure into the inlet of the radiator body, means for continuously introducing a part of the lubricant flowing under heat and pressure in the lubricant introducing means into the liquid in the flow path of the radiator body at a point between the inlet and outlet of the latter so as to reduce the viscosity of the lubricant in said flow path of the radiator body, and means for maintaining pressure on the incoming lubricant and for relieving said pressure when the latter reaches a predetermined degree.

14. A lubricant conditioning device for use in a lubricant circulating system, wherein a lubricant, the viscosity of which varies progressively with changes in temperature, is circulated under pressure and subjected to heat, including a radiator body having inlet and outlet openings and formed to provide a flow path therebetween, a plurality of spaced means within the radiator body disposed so as to provide for the passage of a coolant therethrough and for the passage therearound of the liquid to be conditioned, certain of said means being spaced with respect to each other so as to provide liquid flow paths therebetween of a cross-sectional area which afford resistance to the passage of liquid therethrough, means for spacing certain others of said coolant means so as to provide liquid flow paths of a greater cross-sectional area and of lesser resistance to the flow of liquid therebetween than the resistance to flow occurring between the first-mentioned coolant means, means for introducing lubricant under heat and pressure into the inlet of the radiator body, means for continuously introducing a part of the lubricant flowing under heat and pressure in the lubricant introducing means, into the liquid in the flow path of the radiator body to either side of the inlet of the latter so as to reduce the viscosity of the lubricant in said flow path of the radiator body, and means for maintaining pressure on the incoming lubricant and for relieving said pressure when the latter reaches a predetermined degree.

15. A lubricant conditioning device for use in a lubricant circulating system, wherein a lubricant, the viscosity of which varies progressively with changes in temperature, is circulated under pressure and subjected to heat, including a radiator body having inlet and outlet openings and formed to provide a flow path therebetween, a plurality of spaced means within the radiator body disposed so as to provide for the passage of a coolant therethrough and for the passage therearound of the liquid to be conditioned, certain of said means being spaced with respect to each other so as to provide liquid flow paths therebetween of a cross-sectional area which afford resistance to the passage of liquid therethrough, means for spacing certain others of said coolant means so as to provide liquid flow paths of a greater cross-sectional area and of lesser resistance to the flow of liquid therebetween than the resistance to flow occurring between the first mentioned coolant means, means for introducing lubricant under heat and pressure into the inlet of the radiator body, means for continuously introducing a part of the lubricant flowing under heat and pressure in the lubricant introducing means into the liquid in the flow path of the radiator body at spaced points between the inlet and outlet of the latter so as to reduce the viscosity of the lubricant in said flow path of the radiator body, and means for maintaining pressure on the incoming lubricant and for relieving said pressure when the latter reaches a predetermined degree.

16. A method of conditioning and maintaining the fluidity of a body of oil in the oil circulating system of an engine which consists in flowing such body of oil through paths of relatively high and low resistance to the flow of oil therethrough, and which relatively high and low resistance flow paths are respectively in accordance with the areas of lesser and greater cooling of the oil effected in its flow through the confined cooling space, flowing oil under heat and pressure into heat conductive relationship with the oil in the confined cooling space from the inlet to the outlet thereof, said oil flowing under heat and pressure being additionally utilized to directly and continuously subject the oil in the confined cooling space to the heat and pressure contact thereof at spaced points from a point adjacent the outlet of the confined cooling space to the point of influence of the oil flowing under heat and pressure at the inlet of the confined cooling space, so as to condition the oil in the confined cooling space for flow and maintain the same in a condition of fluidity.

17. A method of conditioning a body of oil for flow through the lubricating system of an engine under low temperature conditions, which consists in flowing oil through a confined space, having an inlet and an outlet, in cooperating paths of relatively high and low resistance to flow of oil therethrough so as to cause a portion of the oil in the high resistance flow path to seek and flow toward and through the low resistance flow path and thence toward and through said outlet, and simultaneously and continuously contacting the confined oil at spaced points between said inlet and outlet with the oil in the system flowing under heat and pressure through said inlet, so as to obtain and thereby maintain the confined oil in a condition of fluidity.

REUBEN G. DYKEMAN.
JOSEPH C. SHAW.
ALLAN C. HOFFMAN.